May 21, 1935.　　　J. M. PATTERSON　　　2,001,744
LIFTING JACK
Filed July 20, 1933　　5 Sheets-Sheet 1
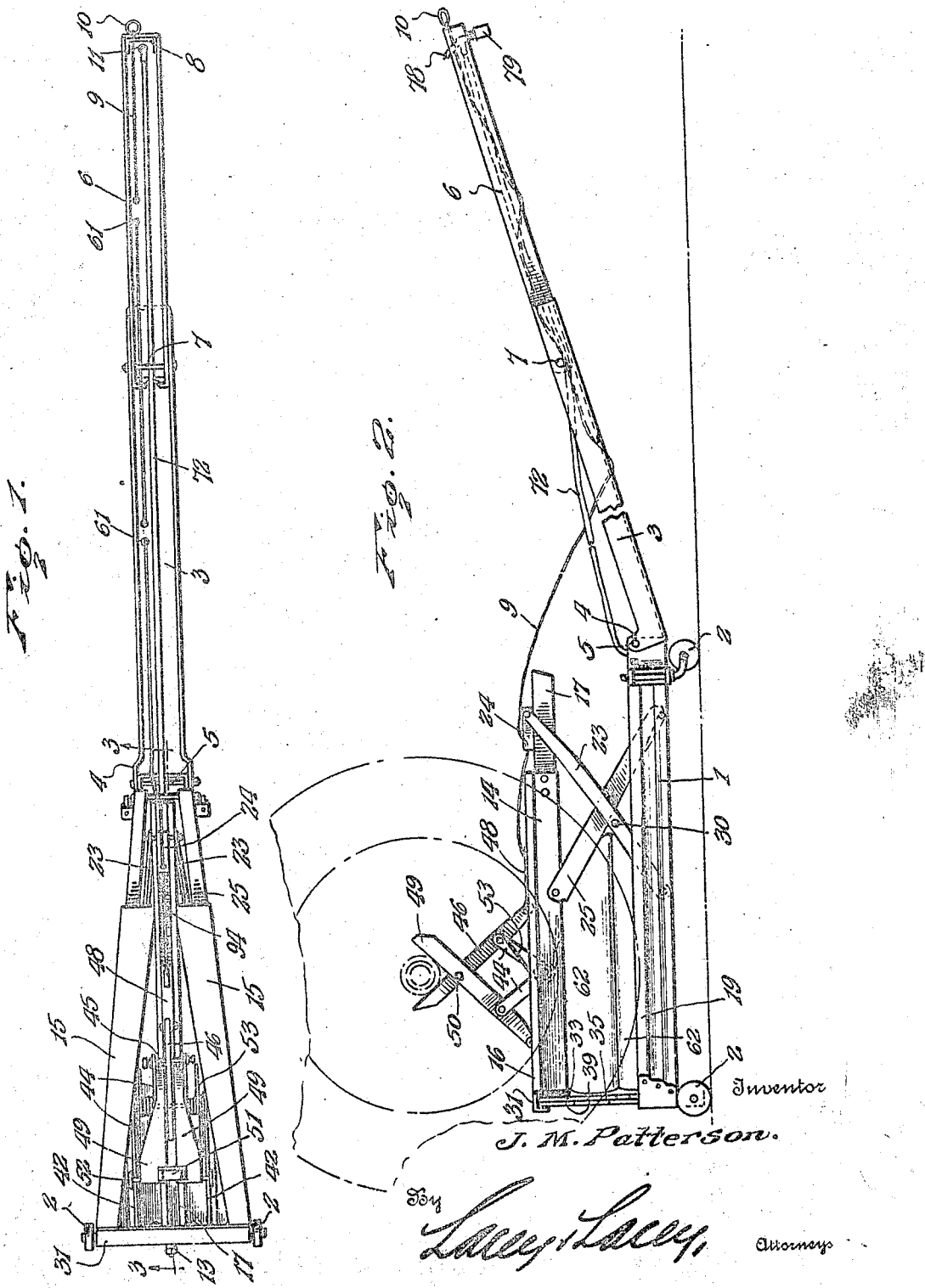

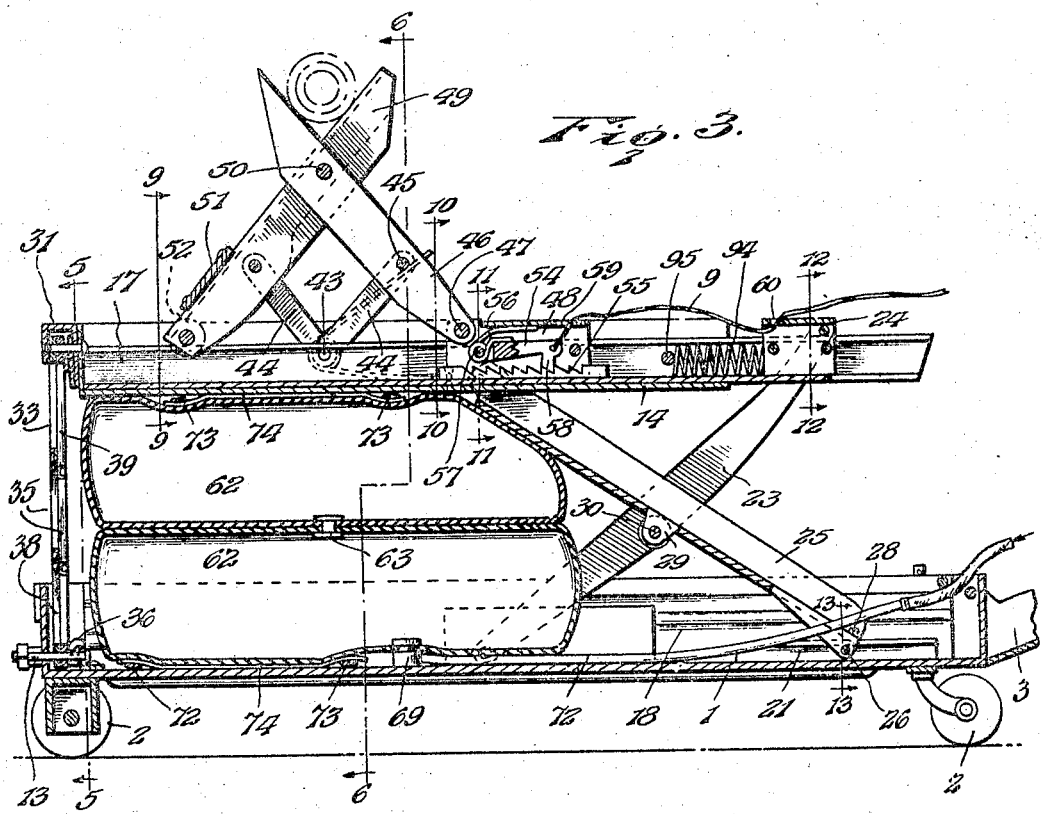

May 21, 1935.   J. M. PATTERSON   2,001,744
LIFTING JACK
Filed July 20, 1933    5 Sheets-Sheet 3
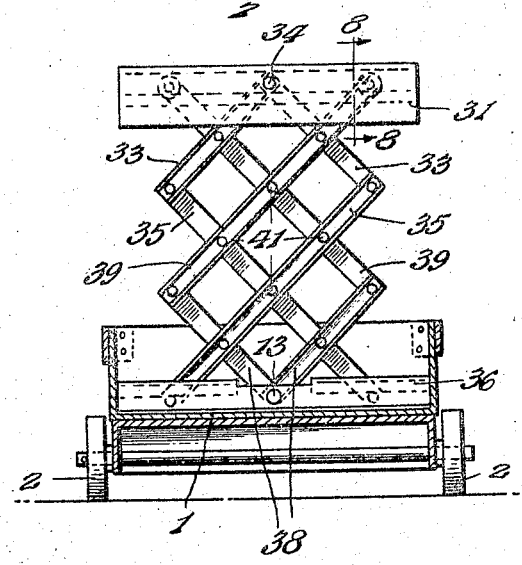
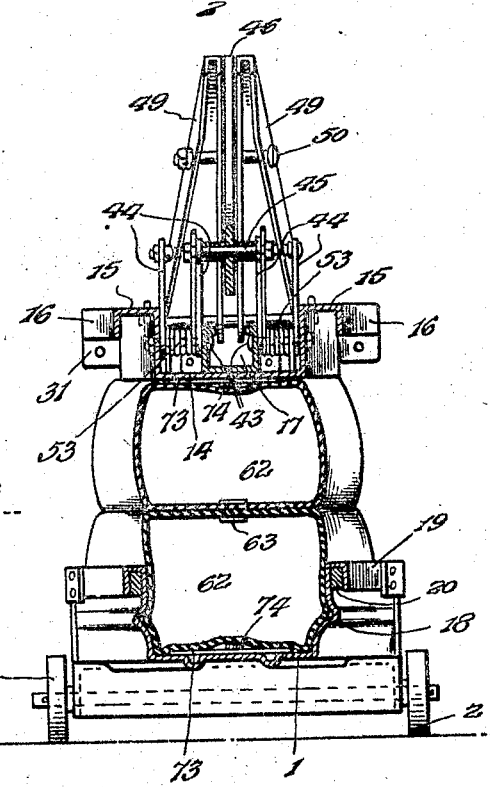
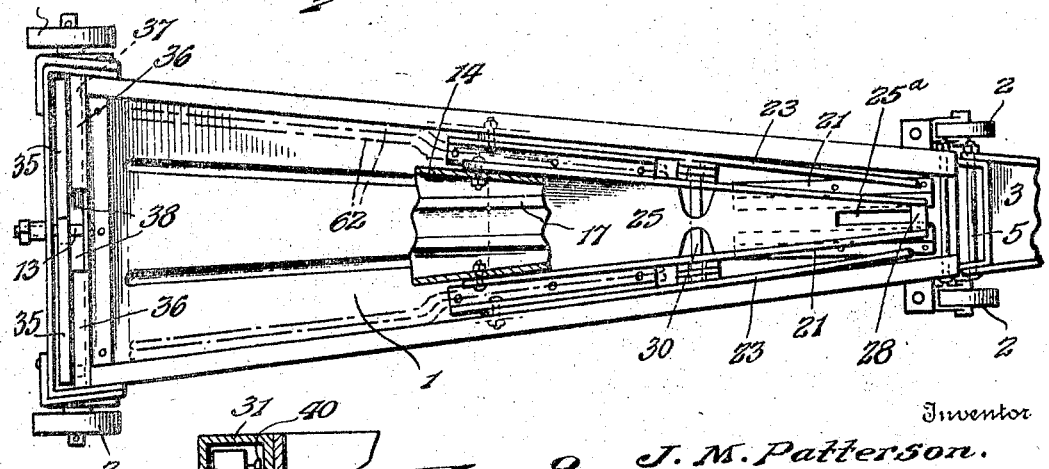
Inventor
J. M. Patterson.
By Lacey & Lacey, Attorneys

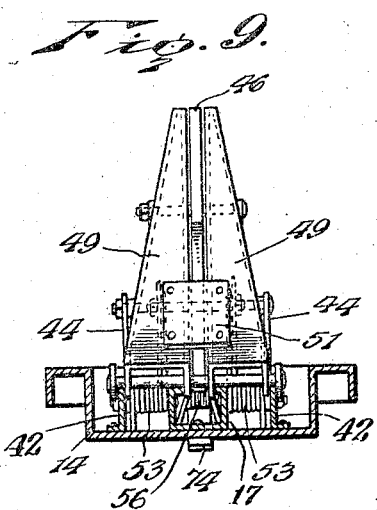
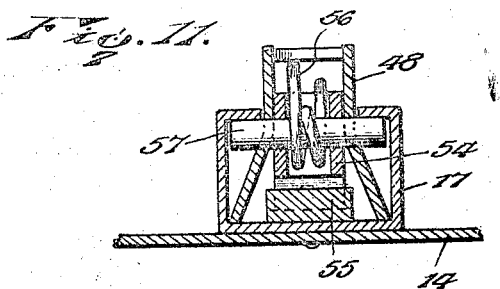
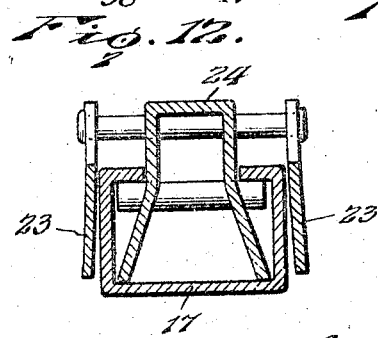
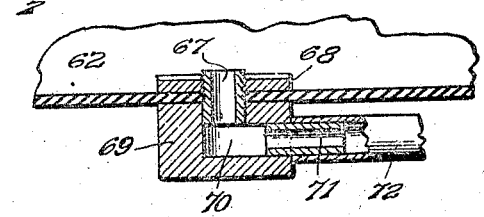
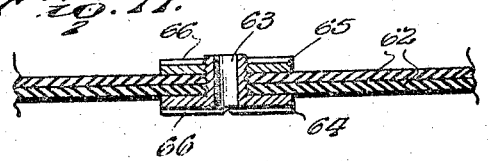
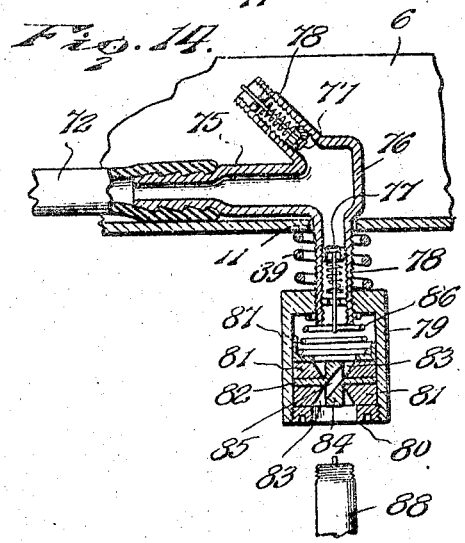
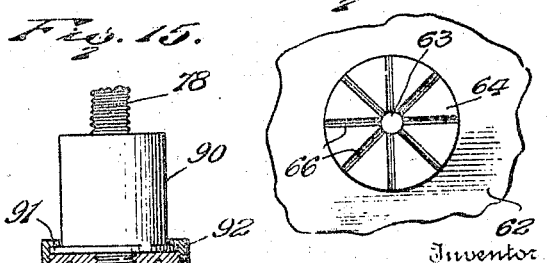

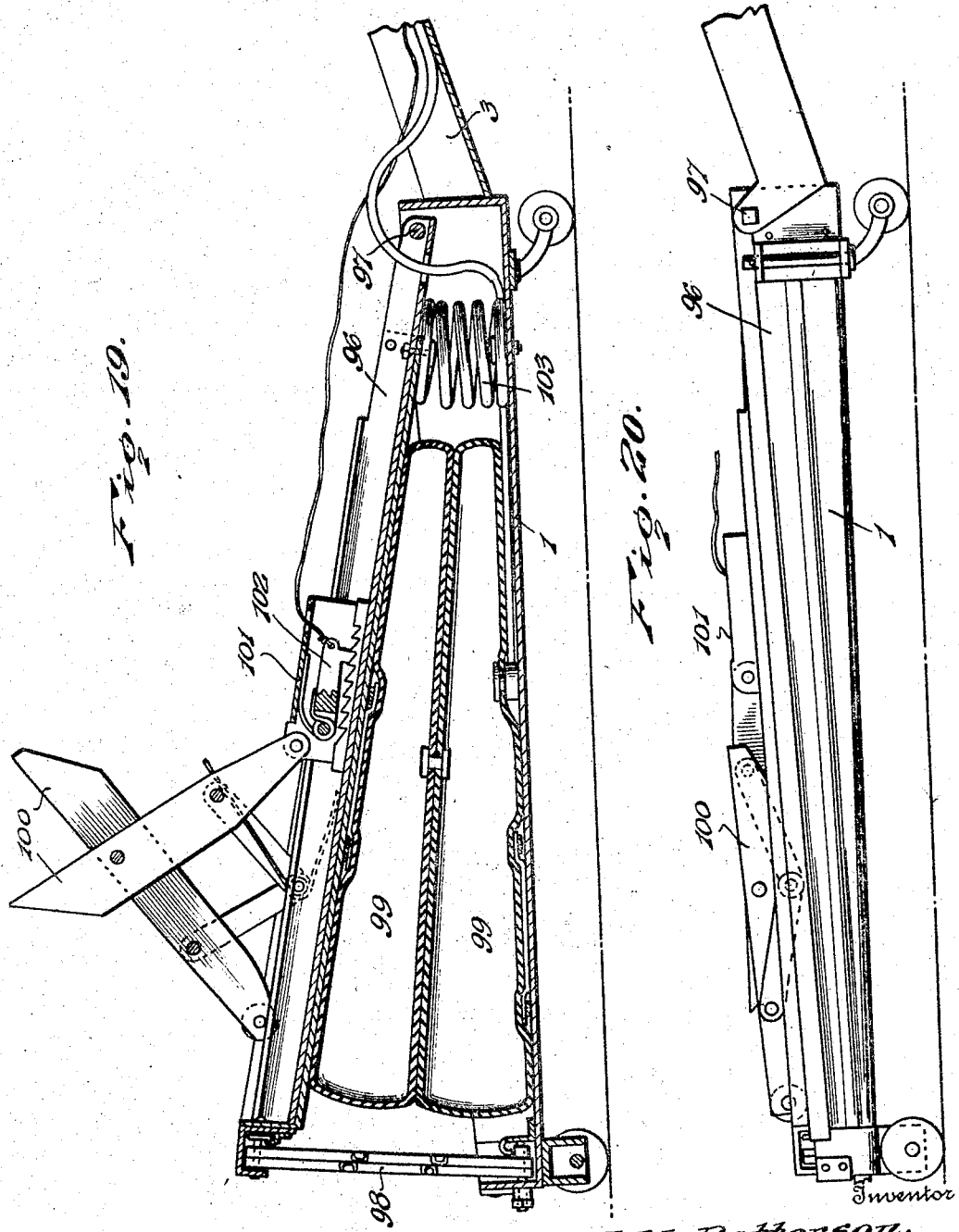

Patented May 21, 1935

2,001,744

UNITED STATES PATENT OFFICE 2,001,744

LIFTING JACK

James M. Patterson, San Antonio, Tex.

Application July 20, 1933, Serial No. 681,352

10 Claims. (Cl. 254—2)

This invention relates to lifting jacks and particularly to jacks intended for use in hoisting the axles of automobiles or other vehicles when repairs to a wheel or tire are necessary and removal of the wheel must be effected. The invention seeks to provide a jack for the stated purpose which may be readily placed in position beneath an axle when there is very little clearance between the axle and the ground and without requiring the operator to reach under the vehicle to place the jack. The invention also seeks to provide a jack in which the lifting or movable member will be elevated through the use of fluid pressure so that it may be actuated through the use of a pump or through connection with a source of compressed air when employed at a service station. And the invention also seeks to provide means whereby the axle may be instantly engaged and held without requiring the operator to reach under or crawl under the vehicle and which means may be released from the axle very easily when repairs have been effected. Other objects will appear incidentally in the course of the following description, and the invention resides in certain novel features which will be particularly pointed out in the claims following the detailed description.

In the annexed drawings,

Figure 1 is a plan view of a jack embodying my present invention,

Figure 2 is a side elevation of the same,

Figure 3 is an enlarged central longitudinal section on the line 3—3 of Figure 1, Figure 4 is a similar view showing the working parts of the jack lowered and fastened in collapsed condition to permit storing of the jack in a small space, Figure 5 is a vertical section on the line 5—5 of Figure 3, Figure 6 is a section on the line 6—6 of Figure 3, Figure 7 is a plan view, partly in section, of the lower portion of the jack with the inflating bags removed, Figure 8 is a detail section on the line 8—8 of Figure 5, Figure 9 is a section on the line 9—9 of Figure 3, Figure 10 is a section on the line 10—10 of Figure 3, Figure 11 is a section on the line 11—11 of Figure 3, Figure 12 is a section on the line 12—12 of Figure 3, Figure 13 is a section on the line 13—13 of Figure 3, Figure 14 is an enlarged detail section of a valve mechanism, Figure 15 is a sectional elevation showing a modification of the valve shown in Figure 14, Figure 16 is an enlarged detail section of the connection between the inflation tube and the lower inflation bag, Figure 17 is a similar view showing the connection between the upper and lower bags, Figure 18 is a detail plan view of one of the plates employed in connection with the bag couplings, Figure 19 is a view partly in elevation and partly in longitudinal section of a modified form of jack, and Figure 20 is a side elevation of the jack shown in Figure 19 but showing the jack in lowered inoperative position.

In carrying out the present invention, there is provided a base 1 which is of triangular form and which is equipped with rollers 2 whereby it may be easily moved from place to place. The rollers at the basal end of the triangular base or platform, are mounted upon brackets at the corners of the platform, while the rollers at the opposite end of the platform are mounted on the sides of the same and are in the form of casters, as best shown in Figures 2 and 7, whereby they may pivot freely and follow the movements of the platform when it is shifted from side to side in order to be brought into a desired position. A handle is pivotally attached to the pointed end of the triangular platform and this handle consists of a channel bar 3 having its side members slightly offset, as shown at 4, and receiving a bolt 5 which passes through the side walls of the platform and thereby pivotally attaches the handle to the platform. A second channel bar or member 6 has one end disposed within the free end of the member 3, as shown in Figure 1, and is pivoted thereto by a bolt 7 inserted through the side flanges or webs of the two members. At the outer or free end of the handle member 6, there is a cross bracket 8 which closes the end of the member and furnishes a stop for a cable or pull wire 9 which is disposed within the handle and the purpose of which will presently appear, the end of the cable or pull wire being provided with a ring 10 or other form of handle whereby it may be easily manipulated and which, by impinging against the cross piece or bracket 8, will prevent the wire being drawn within the handle where it would be difficult to reach. The handle member 6 is also provided, at its free end in its bottom web, with an opening 11 to accommodate an inflation tube which will be presently more particularly set forth. From what has been said, it will be readily understood that the handle member 6 may be folded over upon the member 3 and lie within the same, as shown in Figure 4, when the jack is not in use and is to be stored in a small space. In order to maintain the jack in the collapsed form, shown in Figure 4, a hook 12 may be hung upon the handle member 3 at the end thereof and engaged over the projecting end of a bolt 13 which is mounted in the wider end of the platform, as shown in Figures 3 and 4.

A deck 14 is provided above the base and is of a general triangular form corresponding to the form of the platform. The deck, as well as the platform, as shown best in Figure 6, is U-shaped in cross section and is provided with laterally projecting flanges 15 at the upper edges of its side walls and depending flanges 16 at the outer edges of the flanges 15. Extending longitudinally of the deck and secured upon the floor of the same is a channel bar guide 17 which extends beyond the handle end of the deck, as shown in Figure 2, and terminates approximately over the end of the platform. For convenience, the handle end of the jack will be hereafter referred to as the front end. The deck is supported from the platform by a series of levers which constitute collapsible extensible supports whereby, when the deck is being raised or lowered, it will be maintained in a horizontal position or in a plane parallel with the plane of the platform at all times. The platform is provided with side walls 18 having overhanging flanges 19 along their upper edges and these flanges 19 engage over filler bars 20 which are rigidly secured at the ends of the platform and serve to reinforce the structure. At the inner sides of the side walls of the platform, adjacent the front ends thereof, are rails 21 which, as shown most clearly in Figure 13, are spaced angle bars having inwardly extending flanges 22 along their upper edges. Pivoted at their lower ends to the sides of the platform, at points at the rear of the track rails 21, are levers 23 which extend upwardly and forwardly and have their upper ends pivoted to the opposite sides of a slide 24 fitted within the forward end of the channel bar or guide 17. Pivoted at its upper end to the sides of the deck is a lever 25 which extends downwardly and forwardly from its pivot and has its front end equipped with a retaining pin 26 which slidably engages under the flanges 22 of the rails 21, as shown clearly in Figure 13. The lever 25 is preferably a channel bar tapered toward its front end and having its upper rear end extending across the bottom of the deck with the ends of its flanges pivoted to the sides of the deck. The front end of the lever is formed with a notch 25ª to accommodate the inflation tube, and lips 27 depend from the side walls of the notch and carry the pin 26, as shown, the front end of the notch being bridged by a cross bar 28. It will be readily noted that the lever 25 passes between the levers 23 and the levers are disposed on intersecting lines. At the point of intersection, the lever 25 is provided with ears or lugs 29 struck from its bottom, through which a pivot pin or bolt 30 is inserted, the bolt also being fitted in the levers 23 so that the two sets of levers will be pivotally connected. It will be readily seen that during the raising or lowering movement of the deck the levers 25 and 23 will be caused to swing about their pivotal connections with the deck and platform respectively, and the free end of the lever 25 will move along the tracks 21 while the upper ends of the levers 23, being pivoted to the slide 24, will move with the slide along the guide 17.

At the rear end of the deck is secured an inverted channel bar 31 and on the rear end of the deck, within this channel bar, are alined guide rails 32 which extend transversely of the deck on horizontal lines. At the center of the channel bar 31 I pivot thereto the upper ends of links 33 which diverge from their common pivot 34 and are pivoted at their lower ends to the upper ends of levers 35 which extend down to the platform and have their lower ends equipped with rollers or pins adapted to engage under and be held and guided by guides 36 on the rear end of the platform. These guides, as shown in Figures 3 and 4, may conveniently be rails or brackets having their upper edge portions curved rearwardly and overhanging the main portions of the brackets so as to engage over flanges on the rollers, indicated at 37, which are carried by the lower ends of the levers. At the center of the platform I pivot the lower ends of links 38 which diverge upwardly and have their upper ends pivoted to the lower ends of levers 39 which extend upwardly to points within the channel bar 31 and are equipped at their upper ends with rollers 40 which ride on the guide rails 32, as clearly shown in Figure 8. Upon reference to Figure 5, it will be noted that the several links and levers are pivoted to each other at the points of intersection, as shown at 41. The levers and links thus constitute a lazy tongs which will expand as the deck is raised and collapse as the deck is lowered and will maintain the deck in a stable condition during its movements. The free ends of the levers will move outwardly as the deck is lowered and inwardly or toward each other as the deck is raised and will be held in the proper relation by the respective guides.

Upon the deck, on the rear portion of the same at the sides of the guide 17, are guide rails 42 extending parallel with the guide 17 and secured at their rear ends to the end wall of the deck and at their front ends to the side walls of the same.

The bolts 43 which fasten the front ends of the guides 42 to the sides of the deck and connect the guide 17 thereto are utilized as pivots for the lower ends of links 44 which diverge upwardly from said bolts, as shown in Figure 3, the forwardly extending links having their free ends connected by a bolt 45 which extends pivotally through a gripping lever 46. Said gripping lever 46 is pivoted at its lower end, as shown at 47, to a carriage 48 which is slidably fitted between the sides of the guide 17. The gripping lever 46 extends rearwardly and upwardly and near its upper end is pivoted to and between a pair of coacting gripping jaws or levers 49, as indicated at 50. The gripping jaws or levers 49 are similar in form and have their upper end portions disposed at opposite sides of the gripping lever 46, as clearly shown and as will be understood, the lower end portions of said levers 49 being connected and reinforced by a coupling plate 51 and being provided at their outer corners with rollers 52 which ride upon the guide rails 42, as shown in Figure 1. Springs 53 are coiled around the respective bolts 43 and have their terminals bearing against the floor of the deck and against the pivot bolt 45, respectively, so that they tend constantly to lift said bolt and thereby move the gripping levers or jaws into axle-engaging position. The carriage 48 is slidably fitted between the sides of the guide 17, as has been stated, and houses a detent 54 which is adapted to engage a rack 55 secured on the floor of the deck and disposed between the sides of the carriage and having its forward end disposed at a right angle to the deck, as clearly shown. The detent 54 is normally held to the rack by a spring 56 having one end bearing upon the detent and its opposite end bearing against the roof of the carriage, while its intermediate portion is coiled around the pivot 57 of the detent. The detent is formed with a depending tooth 58 which is adapted to engage in any one of the teeth on the upper side of the rack or engage over the front end of the rack, as shown in Figures 3 and 4 respectively, so that the carriage will be held in any position in which it may be set. It will be understood that when the jack is not in use the gripping levers 46 and 49 are folded down into positions approximately horizontal resting over the respective guides, as shown in Figure 4, and the carriage 48 is then in its forward position with the tooth 58 engaging the front end of the rack bar 55. If the detent be released, the springs 53 will at once act upon the gripping levers and swing them upwardly into the position shown in Figures 2 and 3 whereby they will securely grip and hold an axle. When the levers thus swing upwardly, the ends of the levers 46 and 49 will tend to approach each other and the carriage will, consequently, be drawn rearwardly, the detent automatically riding over the rack and dropping into engagement with one of the teeth of the same so as to coact with the springs 53 in holding the levers raised and firmly gripping the axle of the vehicle, as shown in Figures 2 and 3. The cable or pull wire 9 is attached to the end of the detent 54 so that a pull upon the wire will release the detent from its engagement with the rack and will thereby permit the springs 53 to raise the levers or, if the levers are in raised position, a continued pull upon the pull wire 9 will cause the carriage to slide forwardly and thereby return the gripping levers to their lowered position and release the axle. The wire is carried out through an opening 59 in the top of the carriage and then through an opening 60 in the top of the slide 24, its outer portion being passed through openings 61 in the handle members so that the wire will be held against loss and may be readily folded with the handle. The channel formation of the handle members permits the wire to be housed therein and guided thereby and also will retain it in proper relation to the other parts when the jack is in collapsed condition.

Supported by the platform and bearing against the underside of the deck are inflatable bags 62 which may be made of rubber or other material which will hold air and which will be durable so as to withstand the rough usage to which the tool is subjected. The upper and lower bags are connected by a tubular coupling 63 which is threaded externally, as shown in Figure 17, and provided with a flange 64 whereby a firm bearing against the fabric of the bag will be attained. The threaded nipple or coupling is inserted through alined openings provided therefor in the adjacent sides of the bag and secured by a washer 65 threaded onto the tube, as shown. The flange 64 and the washer are provided with radial grooves 66 to facilitate their engagement by a turning tool, and it will be understood that the coupling is fitted in place before the bags are completely closed and the walls of the bags are then completed by cementing or otherwise joining the edges of the opening so as to prevent a leak-proof container. Inflating fluid, such as compressed air, is directed into the lower bag through a nipple 67 which is secured in place by a washer 68 corresponding in all respects, to the washer 65. The outer end of the nipple 67 is fitted in a coupling block 69 having a chamber 70 therein which receives a nipple 71 carried by the end of a hose or inflation tube 72. The tube or hose 72 is disposed within the channel handle members 3 and 6, as will be understood upon reference to Figures 1 and 2, so that it will be held thereby and will be readily housed when the device is stored in collapsed condition, as indicated in Figure 4. The outer end of the hose is equipped with a multiplex inflation valve, shown in Figure 14, and which will be presently described in detail. On the upper side of the upper bag 62 and on the underside of the lower bag 62, I secure clips or loops 73 which are engaged over the ends of retainers 74 secured upon the platform and the deck respectively, whereby the bags will be firmly held in place, as will be understood upon reference to Figures 3 and 4. These retaining clips will effectually resist any tendency of the bags to move out of place during either inflation or deflation, or any shifting of the jack.

The outer end of the hose or inflation tube 72 if fitted on a nipple 75 which extends from the side of a hollow body 76 having inwardly opening check valves 77 housed within nipples 78 extending from its opposite ends. One of the nipples is inserted through the opening 11 in the handle member 6, at the end thereof, and is externally threaded to receive and hold a cylindrical casing 79. This casing 79 is equipped at its outer end with a plug cap 80 and resting against the inner side of the cap is a plunger comprising rings 81 which are disposed at opposite side of a disk 82 and have their bores flared from the disk toward the remote sides of the rings, as shown at 83. The disk is provided, at its center, with ribs or blocks 84 projecting from the opposite faces of the disk and having a passage 85 extending diagonally therethrough to establish communication between the bores of the respective rings 81, as clearly shown in Figure 14. An expansion spring 86 is disposed within the cylindrical casing and bears at one end against the closed end wall of the casing and at its opposite end upon the inner ring 81, a washer 87 being disposed between the end of the spring and the side of the ring so as to avoid leakage around the outer edges of the ring. The inflation valves or check valves 77 are of well-known form, consisting of disks seating against spiders in the nipples and held outwardly against their seats by expansion springs. It will be understood, from what has been said, that when the jack is to be used it is pushed under the axle of the vehicle and the pull wire 9 is then pulled so as to release the detent 54 whereupon the springs 53 will at once move the gripping levers or jaws upwardly and cause them to firmly grip the opposite sides of the axle. Compressed air is then admitted to the hose 72 and will at once enter the lower inflation bag 62 and expand the same, subsequently flowing into the upper bag so that it will be expanded and the deck fully raised and supported in the raised position. When the jack is in use at a service station, the upper nipple 78 may be connected with the hose from the compressed air reservoir which is usually maintained at such places, and the air under pressure will flow through the valve 77 therein and pass through the hose in an obvious manner. When the bags 62 are to be deflated so as to release the jack, the connection with the compressed air supply is released and a slight pressure upon the stem of the inflation valve will hold it in open position so as to permit the escape of the air. When it is necessary to use the device on the road, the supply of compressed air may be obtained from one of the tires of the vehicle and this will be accomplished by simply engaging the casing 79 over the inflation valve of the tire, indicated at 88. The plug cap 80 is provided with a central opening to receive the end of the tire valve in an obvious manner and when thus engaged over the end of the tire valve the stem of said valve will impinge against the block 84 and will be thereby pushed inwardly so as to open the valve and permit the air to escape. The end of the tire valve core will seat in the beveled bore 83 so as to prevent leakage and the air will flow through the passage 85 and the bore 83 of the inner ring 81 to the check valve 77, the latter valve being opened by pushing the casing 79 down over the tire valve to such an extent that the plunger will be pushed up against the stem of the valve 77 and unseat said valve. I have found in actual practice that sufficient air may be withdrawn from a tire to inflate the bags of the jack and sustain the jack in the raised operative position without deflating the tire to such an extent that its use in the deflated condition will be harmful. Of course, if the vehicle is equipped with one or more spare tires, which are normally inflated, pressure may be taken from one of the spare tires. If the casing 79 be turned home on the nipple, the valve 77 will be held in the open position and air may flow freely to the bags until they are fully inflated whereupon the casing is turned so as to ride outwardly on the nipple, permitting the valve 77 to close and pressure to be held in the bags as long as necessary. When the work has been completed and the jack is to be withdrawn, the casing 79 is turned home toward the handle member to again bring the inner side of the block 84 against the stem of the adjacent valve 77 so as to unseat said valve and permit escape of the air. To avoid accidental inward movement of the valve casing 79 an expansion spring 89 is disposed about the nipple on which the valve is mounted, between the valve casing and the handle member, as clearly shown in Figure 14.

A slight modification of the relief valve is illustrated in Figure 15 in which the casing 90 is provided at its outer end with an annular flange 91 and a flange ring 92 is engaged about said flange, the ring 92 being closed at its outer side by a cap plug 93 threaded therein and provided with a central opening which may be engaged with the end of a tire valve. The internal structure of the valve is the same in all respects as that shown in Figure 14 and heretofore described.

When the valve is set to release the pressure in the bag 62 the weight of the jack will tend to initiate and maintain the deflating movements of the bag. To facilitate and expedite the deflation however, an expansion spring 94 is disposed within the channel guide 47 and bears at one end against the slide 24 and at its opposite end against an abutment 95 in the guide so that it tends constantly to move the slide forwardly, thereby accelerating the movement of the levers 25 and 26 when the jack is being lowered.

In Figures 19 and 20 I have illustrated a somewhat simpler form of the jack in which the same platform 1 is employed with a handle member 3 pivoted to the front end thereof. The deck 96, in this form of the invention, is pivoted to the front end of the platform by the same bolt 97 which pivotally attaches the handle thereto, the rear end of the deck being connected with the rear end of the platform by a lazy tongs 98 corresponding in all respects to the levers and links shown in Figure 5, and previously described. Inflation bags 99 are interposed between the platform and the deck and correspond in all respects to the bags shown in the first described form. Gripping levers 100 are employed and correspond to the gripping levers previously illustrated, and they are connected to a carriage 101 which is held in a set position by a detent 102. At the front end of the jack a retractile spring 103 is interposed between the platform and the deck and is secured thereto. When the jack is inflated, the spring 103 will be expanded and the instant the pressure is relieved from the inflation bags the spring will contract and aid in returning the deck to the lowered position. The operation of this form of the invention is the same in all essential respects as that of the first described form, the only difference being that the upper deck moves in an arc about a pivot whereas in the first described form the deck moves bodily upwardly or downwardly in a direct line and is maintained in a stable horizontal condition at all times.

My improved lifting jack has been found to be highly efficient in use. It is especially advantageous in use upon the road as it may be readily pushed under an axle, even when the axle is very close to the ground, inasmuch as in its collapsed condition it is close to the ground and when the handle is extended the operator may manipulate the platform so as to roll it under the axle of the vehicle while maintaining his position at some appreciable distance from the vehicle. After the jack has been pushed under the vehicle, the pull wire is drawn upon, as previously stated, so that the gripping levers or jaws will be at once moved upward to grasp the axle and they will be held against reverse movement under the weight of the vehicle by the detent 54. When the bags are inflated, the deck will be raised and the vehicle thus lifted so that the wheel will be raised from the ground and necessary repairs may be made. If the vehicle should become mired in wet or very soft soil, the jack may be utilized to lift the wheel out of the hole into which it has sunk and maintain it raised until boards or other elements may be placed in position beneath the wheel so that the vehicle may be driven onto the firm part of the road. When the jack is collapsed, it will occupy a very small space and may be easily stowed in a vehicle and, in the collapsed form, the deflated bags may fold against the sides of the platform so as not to interfere with the nesting of the deck therein.

Having thus described the invention, I claim:
1. A lifting jack comprising a platform, a deck supported above the platform, means for raising and lowering the deck, gripping levers pivoted together near their working ends and having their opposite ends slidably connected with the deck, means for moving said levers upwardly, other means for moving the levers downwardly, and means for holding the levers in a set position.

2. A lifting jack comprising a platform, a deck supported above the platform, means for raising and lowering the deck, gripping levers pivoted together near their working ends and having their opposite ends slidably mounted on the deck, links pivoted to the deck between the levers and having their outer ends pivoted to the levers, springs bearing constantly upon the levers and tending to raise the same to grip an article, a carriage on the deck, means for moving the carriage along the deck, the carriage being connected with one of the levers whereby to move the levers into inoperative position, and means for holding the carriage in a set position.

3. A lifting jack comprising a platform, a deck supported above the platform, means for raising and lowering the deck, links pivoted together and to the deck, levers pivoted together near their outer ends for gripping an article and having their inner ends movably mounted on the deck, the outer ends of the links being pivoted to said levers between the ends of the levers, a carriage slidably mounted on the deck and to which the lower end of one of the levers is pivoted, means for moving the carriage along the deck, a rack bar on the deck extending through the carriage, and a detent on the carriage adapted to engage said rack bar whereby to hold the gripping levers in a set position.

4. A lifting jack comprising a platform, a deck disposed above the platform, means for raising and lowering the deck, a lazy tongs connecting the rear ends of the deck and the platform and including elements pivoted to the platform, elements pivoted to the deck and elements pivoted to said pivoted elements and slidably connected to the deck and platform respectively, and extensible connections between the front ends of the deck and the platform.

5. A lifting jack comprising a platform, a deck disposed above the platform, means for lowering and raising the deck, a lazy tongs connecting the rear ends of the deck and the platform, crossing levers pivoted together at their point of intersection and having their rear ends pivoted to the deck and the platform respectively, and slidable connections between the front ends of said levers and the platform and deck respectively.

6. A lifting jack comprising a platform, a deck mounted above the platform, means for raising and lowering the deck, lazy tongs connecting the rear ends of the deck and the platform, tracks on the platform at the front end of the same, a slide mounted on the deck at the front end of the same, yieldable means acting on said slide to move the same forwardly, a lever having its rear end pivoted to the deck and its front end slidably engaged with the track on the platform, and a second lever having its rear end pivoted to the platform and its front end pivoted to the slide, said levers being pivoted together at their points of intersection.

7. A lifting jack comprising a platform, a deck pivoted at its front end to the platform, a lazy tongs connecting the rear ends of the platform and the deck, means for raising and lowering the deck, and a retractile spring connecting the deck and the platform near their front ends.

8. A lifting jack comprising a portable platform, a deck supported above the platform, superposed inflatable bags mounted between the platform and the deck and connected therewith, a tubular coupling connecting the bags and establishing communication between them, a tubular coupling fitted in the side of the lower bag, and an inflation tube connected with said coupling and extending from the platform.

9. In a lifting jack, a platform, a deck mounted above the platform, inflatable bags disposed between the platform and the deck for raising the deck and supporting it in raised position, an inflation tube connected with and leading from the bags, an inflation body fitted to the outer end of the inflation tube and having a laterally extending nipple, an inwardly opening check valve within the nipple, a casing mounted on said nipple and movable along the same, said casing being adapted to be engaged over the end of a tire valve, a block within the casing adapted to impinge upon the stem of a tire valve for opening the same, said block having a passage therethrough, means within the casing for yieldably holding the block to the outer end of the casing, and means for yieldably holding the casing at the outer end of the nipple, the block in the casing being adapted to unseat the check valve in the nipple when the casing is moved home inwardly over the nipple.

10. A lifting jack comprising a platform, a deck above the platform, means for raising and lowering the deck, an extensible connection between the rear ends of the platform and the deck, and cross levers pivoted together at their points of intersection and having their rear ends pivoted to the deck and platform respectively and their front ends slidably connected to the platform and deck respectively adjacent the front ends thereof.

JAMES M. PATTERSON. [L. S.]